United States Patent [19]

Tanioka et al.

[11] Patent Number: 5,101,373
[45] Date of Patent: Mar. 31, 1992

[54] SYSTEM AND METHOD FOR SECURING REMOTE TERMINAL AND REMOTE TERMINAL PROGRAM

[75] Inventors: Katsuaki Tanioka, Kasugai; Yoro Mizuno, Seto, all of Japan

[73] Assignee: Hitachi, Ltd., Tokyo, Japan

[21] Appl. No.: 440,431

[22] Filed: Nov. 21, 1989

Related U.S. Application Data

[63] Continuation of Ser. No. 38,014, Apr. 14, 1987, abandoned.

[51] Int. Cl.$^5$ .................. G06F 11/08; G06F 11/14; G06F 11/16; G06F 12/14
[52] U.S. Cl. .................. 364/900; 364/927.92; 364/927.96; 364/927.98; 364/931.4; 364/931.44; 364/933.9; 364/935; 364/935.2; 364/935.3; 364/940; 364/940.61; 364/940.68; 364/942.3; 364/942.4; 364/944.5; 364/946; 364/947; 364/947.2; 364/918.7; 364/949.71; 364/949.91; 364/949.81
[58] Field of Search ... 364/200 MS File, 900 MS File; 380/24, 28, 29

[56] References Cited

U.S. PATENT DOCUMENTS

| | | | |
|---|---|---|---|
| 4,123,747 | 10/1978 | Lancto et al. | 340/149 A |
| 4,438,824 | 3/1984 | Mueller et al. | 178/22.08 |
| 4,463,417 | 7/1984 | Bushaw et al. | 364/200 |
| 4,486,828 | 12/1984 | Kitamura et al. | 364/200 |
| 4,578,530 | 3/1986 | Zeidler | 178/22.09 |
| 4,634,808 | 1/1987 | Moerder | 178/22.14 |
| 4,652,698 | 3/1987 | Hale et al. | 380/24 |
| 4,720,860 | 1/1988 | Weiss | 380/23 |

*Primary Examiner*—Thomas C. Lee
*Assistant Examiner*—Robert B. Harrell
*Attorney, Agent, or Firm*—Fay, Sharpe, Beall, Fagan, Minnich & McKee

[57] ABSTRACT

A data processing system in which terminal equipment and a central processing unit are connected to each other to make communication therebetween. A program for terminal use held by terminal equipment is also held by the central processing unit. Using parameters for approval operation generated by the central processing unit, the terminal equipment and the central processing unit perform the approval operations of programs for terminal use held by each of them. Results of the approval operations are compared by the central processing unit. If they are in agreement with each other, the communication is permitted to be continued relative to the terminal equipment.

15 Claims, 3 Drawing Sheets

SYSTEM AND METHOD FOR SECURING REMOTE TERMINAL AND REMOTE TERMINAL PROGRAM

This is a continuation of copending application Ser. No. 07/038,014 filed on Apr. 14, 1987, now abandoned.

BACKGROUND OF THE INVENTION

1. Field of the Invention

The present invention relates to a data processing system, and particularly to a data processing system effective for the cases that include terminal equipment having a program of high importance dealing with secret information, such as an on-line system in a banking organ.

2. Prior Art

Secracy in an on-line system can be improved by a system in which, for example a central processing unit detects an unwarrantable terminal that is connected, and logically inhibits the communications between the unwarrantable terminal and the central processing unit. A concrete means can be represented by a system disclosed, for example, in Japanese Patent Laid-Open No. 137957.

According to the technique disclosed in the above publication, the diagnosis processing program in the central processing unit sends a microprogram for diagnozing terminal equipment to terminal equipment which executes a calculation with the hardware that constitutes the terminal equipment as a parameter and sends the result back to the central processing unit. The central processing unit then compares the result with a fixed value that has been stored in the central processing unit to thereby determine if the above terminal equipment is warrantable or not. When it is determined that the terminal equipment is not warrantable, communication is interrupted relative to the central processing unit.

Therefore, whether the terminal equipment equipped with constituent element (hardware) permitted as a system is warrantable or not, can be automatically and easily detected by the central processing unit without relying upon the operation.

In the above-mentioned system, however, no consideration has been given to cope with the operation by the forged program or unwarranted program in the terminal equipment. The microprogram (operation program) for diagnosis is sent from the central processing unit. Therefore, if the constituent element only of the terminal equipment is brought into agreement with a warrantable terminal equipment, the communication is made possible relative to the terminal equipment even though the program may have been forged therein.

According to the above-mentioned system, furthermore, a method which compares the calculated result from the terminal equipment with a fixed value prepared in advance in the central processing unit is employed in the central processing unit as means for detecting the warrant of the terminal equipment. Therefore, the communication could be easily made possible relative to the central processing if a person learns by eavesdropping a warrantable fixed value from a warrantable terminal equipment and if he forges a program to forge the warrantable terminal equipment to send the warrantable fixed value to the central processing unit.

SUMMARY OF THE INVENTION

The present invention is an improvement over the above-mentioned circumstances. Its object is to provide a data processing system which features high security performance eliminating the above-mentioned problems inherent in the conventional data processing systems. A forged program or an unwarrantable program in the terminal equipment is detected by the central processing unit to which terminates the communication. The central processing unit also detects a forged value acquired by eavesdropping on the terminal equipment and interrupts communication.

In a preferred data processing system in accordance with the present invention, the central processing unit generates parameters for approval operation through an approval operation parameter generator. The parameters differ every time since they are generated like random numbers. The parameters that are generated serve as inputs to the terminal equipment and to the approval operation unit of the central processing unit. Once the parameters are received, the terminal equipment performs the approval operation through the approval operation unit for its own program, and sends the result to the central processing unit.

Similarly, the central processing unit performs the approval operation through the approval operation unit for a terminal program that is held in the central processing unit with the parameter as an input. The approval unit of the central processing unit compares the result of approval operation from the terminal equipment with the result of approval operation from the central processing unit, and interrupts the communication to the terminal equipment when they are not in agreement with each other.

When the program of the terminal equipment is forged or when the unwarrantable program is operated, the result of approval operation by the terminal equipment becomes different from the result of approval operation by the central processing unit, or the result of approval operation is no more transmitted to the central processing unit. This fact, therefore, is detected by the central processing unit, and the communication relative to the unwarrantable terminal is interrupted as described earlier.

Further, since the parameter for approval operation differs each time, the result of approval operation also differs each time. Therefore, even if a person learns by eavesdropping the result of approval operation produced by the warrantable terminal and even if he forges the warrantable terminal equipment, the forgery is detected by the central processing unit and the communication to the unwarrantable terminal is interrupted as described earlier.

DESCRIPTION OF THE PREFERRED EMBODIMENT

An embodiment of the present invention will now be described in detail in conjunction with the drawings.

In the embodiment described below, the approval operation is carried out by employing a DES (data encryption standard) cipher, an initial value of the DES cipher as a parameter, and an encipher key.

Figure 1:
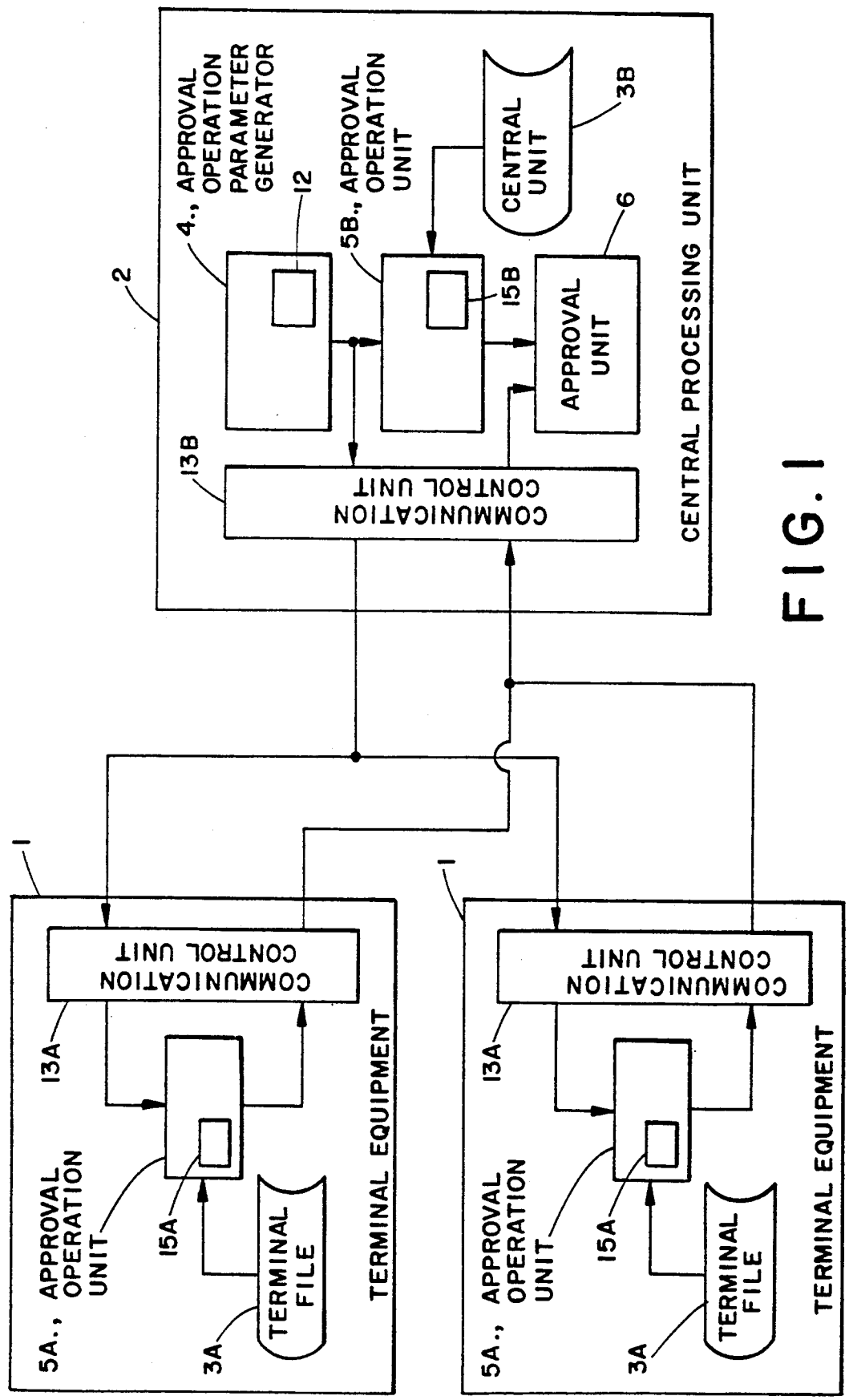
FIG. 1 is a block diagram illustrating a terminal connection system according to an embodiment of the present invention.

FIG. 1 is a block diagram of a data processing system according to an embodiment of the present invention, wherein reference numeral 1 denotes a terminal equipment, and 2 denotes a central processing unit.

The terminal equipment 1 includes a terminal file 3A, an approval operation unit 5A, and a communication control unit 13A. The terminal file 3A holds a terminal program which carries out the operation of the terminal equipment. The approval operation unit 5A is provided with an encipher unit 15A for forming the DES cipher.

The central processing unit 2 includes a central file 3B, an approval operation parameter generator 4, an approval operation unit 5B an approval unit 6, and a communication control unit 13B. The central file 3B holds the content same as the program held by the terminal file 3A, in other words, the central file stores a copy of the program held by the terminal file. When many terminal equipment 1 are connected to the central processing unit 2, the central file 3B holds programs that are held by the terminal files of the respective terminal equipment. The approval operation unit 5B is provided with an encipher unit 15B.

The approval operation units 5A and 5B, communication control units 13A and 13B, and encipher units 15A and 15B, are constructed in the same manner, respectively.

Reference numeral 16 denotes an approval operation parameter message from the central processing unit 2 to the terminal equipment 1, and 17 denotes an approval operation result message from the terminal equipment 1 to the central processing unit 2.

FIGS. 2(A) and 2(B) are diagrams illustrating the internal structures of the approval operation parameter message 16 and the approval operation result message 17. The approval operation parameter message 16 consists of a flag 18 which states that this is an approval operation parameter message, a subsequent initial cipher value 20 and an encipher key 21. The initial cipher value 20 and the encipher key 21 are generated by the random number generating unit 12, and serve as input parameters to the approval operation units 5A and 5B of the terminal equipment and the central processing unit 2.

The approval operation result message 17 consists of a flag 19 which states that this is an approval operation result message and a subsequent final cipher value 22. The final cipher value 22 is a result produced by the approval operation unit 5A of the terminal equipment 1.

Figure 3:
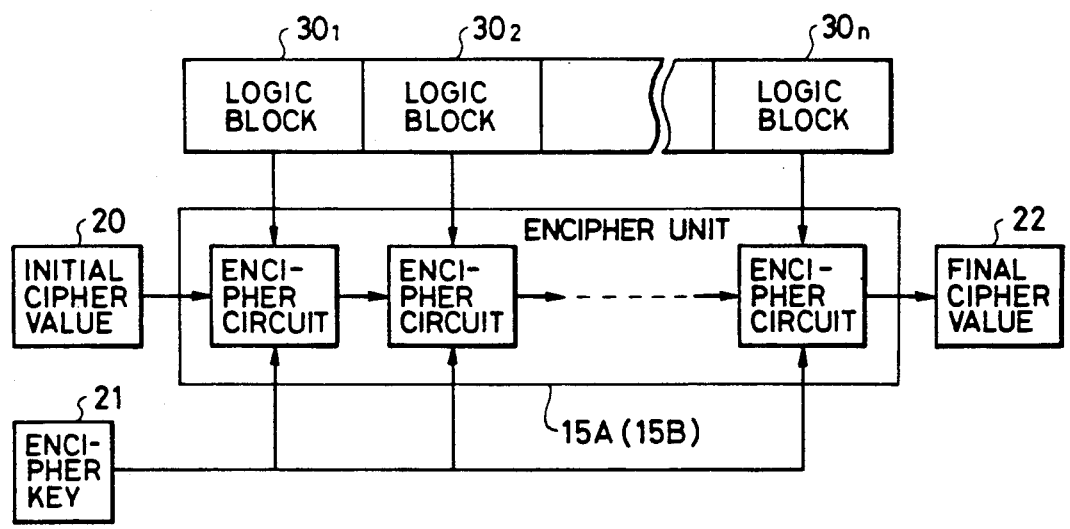
FIG. 3 is a logic diagram of approval operation units 5A and 5B.
Figure 4:
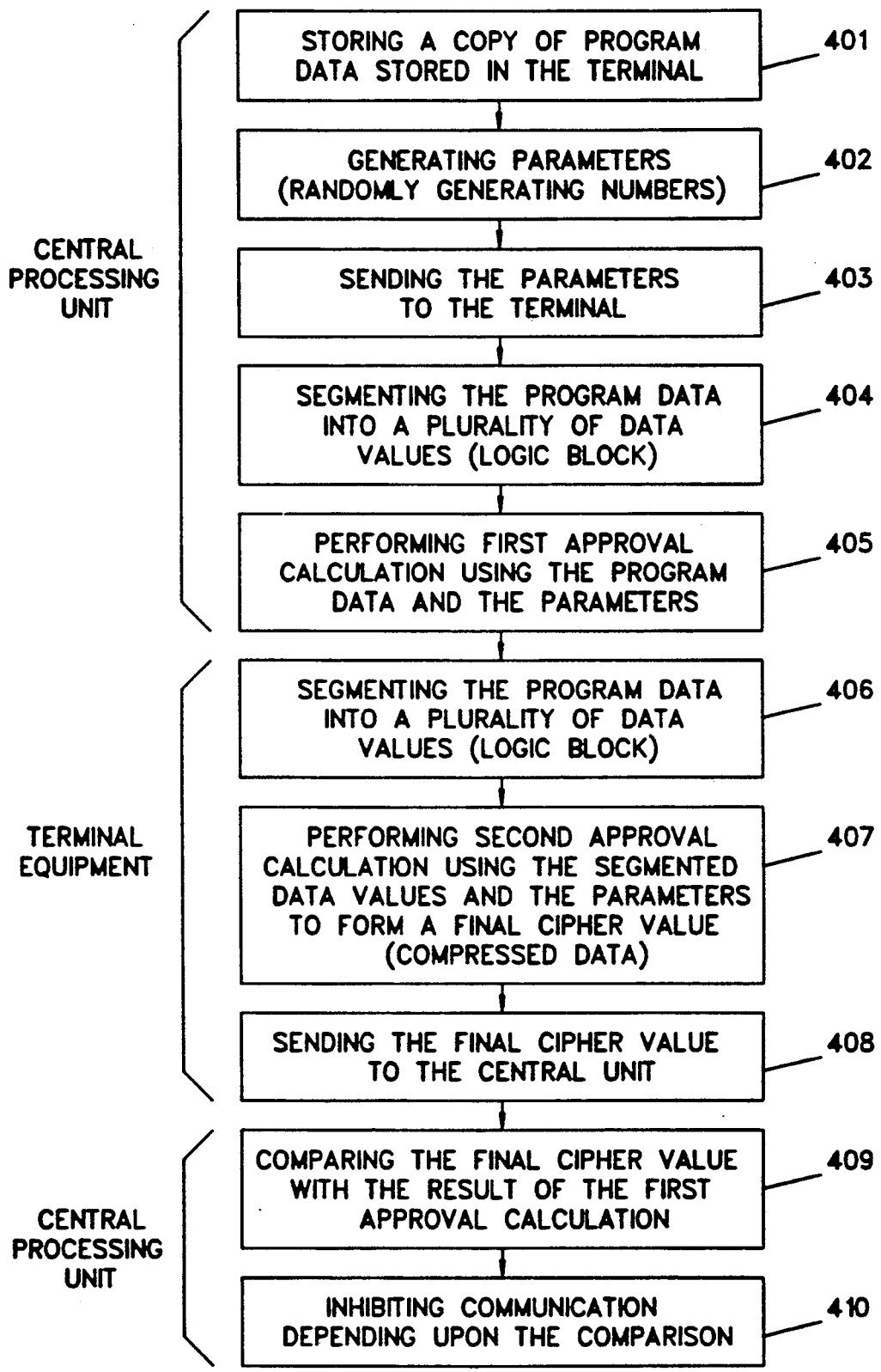
FIG. 4 is a detailed flow chart illustrating the process steps for using a cipher value to secure communication between a central processing unit and remote terminal equipment.

FIG. 3 is a logic diagram showing the approval operation units 5A and 5B, wherein reference numerals $30_1$ to $30_n$ denote logic blocks. The logic blocks are segments of the program data from the terminal (or a program of the terminal equipment 1 read from the central file 3B). Each segment consists of a fixed length (e.g., eight bytes of the program data).

The DES cipher is formed by the encipher units 15A and 15B for the terminal program using the initial cipher value 20 and the encipher key 21 as input parameters, and the cipher value of the final logic block $30_n$ is used as the final cipher value 22.

Figure 2:
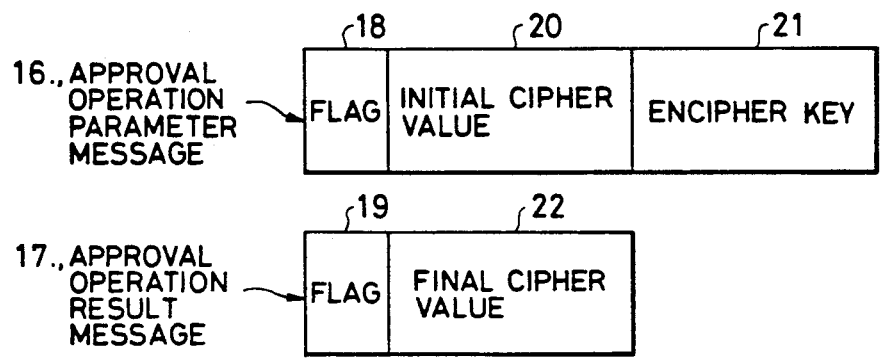
FIG. 2(A) is a diagram illustrating the internal structure of an approval operation parameter message.
FIG. 2(B) is a diagram illustrating the internal structure of an approval operation result message 17.

Operation of the embodiment will now be described in conjunction with FIGS. 1 to 3.

If the linkage is established between the terminal equipment 1 and the central processing unit 2, a random initial cipher value 20 and an encipher key 21 are formed by the random number generating unit 12 in the central processing unit 2, and are compiled as an approval operation parameter message 16 by the approval operation parameter generator 4, and are transmitted to the approval operation unit 5B as well as to the terminal equipment 1 via the communication control unit 13B. This is referred to as "timing A".

As the approval operation parameter message 16 is received by the communication control unit 13A in the terminal equipment 1, the approval operation unit 5A performs the approval operation.

The approval operation unit 5A extracts the initial cipher value 20 and the encipher key 21 from the approval operation parameter message 16, and forms the DES ciphers through the encipher unit 15A for each of the logic blocks $30_1$ to $30_n$ of the program read from the terminal file 3A. Described below in detail are the steps therefor.

(A) A DES cipher is formed for the logic block $30_1$ upon receipt of the extracted initial cipher value 20 and the encipher key 21.

(B) A DES cipher is formed for the logic block $30_2$ upon receipt of the cipher value found in (A) above and the encipher key 21.

(C) Similarly, DES ciphers are formed for the subsequent logic blocks.

(D) Finally, the result of forming a DES cipher for the logic block $30_n$ is used as the final cipher value 22.

The thus found final cipher value 22 is compiled as the approval operation result message 17, and is transmitted to the central processing unit 2 via the communication control unit 13A.

In the central processing unit 2, on the other hand, the approval operation unit 5B extracts the initial cipher value 20 and the encipher key 21 from the approval operation parameter message 16, and the encipher unit 15B successively forms DES ciphers for the logic blocks $30_1$ to $30_n$ of the program of the terminal equipment 1 read from the central file 3B. This operation is quite the same as that of the approval operation unit 5B of the terminal equipment 1. When the approval operation result message 17 is received by the communication control unit 13B, the approval unit 6 performs the approval. The approval unit 6 extracts the final cipher value 22 from the approval operation result message 17, and compares it with the final cipher value of the approval operation unit 5B. If they are in agreement, the approval unit 6 permits the communication to be continued for the terminal equipment 1. If they are not in agreement, the approval unit 6 inhibits the communication relative to the terminal equipment 1.

With reference to FIG. 1, the feature of this embodiment resides in that the approval operation unit 5A in the terminal equipment 1 and the approval operation unit 5B in the central processing unit 2 perform quite the same approval operation for the same program.

According to this embodiment, the terminal equipment 1 and the central processing unit perform quite the same approval operation relying upon the parameters (initial cipher value 20 and encipher key 21) generated by the central processing unit 2 which performs the comparison and collating. Therefore, the central processing unit 2 is capable of detecting the cases where the program in the terminal equipment is not a warrantable program expected by the central processing unit, i.e., capable of detecting the cases where the program of the terminal equipment is forged, as well as where the terminal equipment is operated on an unwarrantable program. In such cases, the central processing unit 2 inhibits the communication to the terminal equipment 1.

Moreover, the parameters are generated by the random number generator 12 quite in a random fashion so that the result of approval operation differs each time. Therefore, even if a person eavesdrops the result of approval operation of a warrantable terminal equipment and forges or counterfeits the program of the terminal equipment in order to return the eavesdropped value to the central processing unit 2 as the result of approval operation, the forgery is detected by the central processing unit which, then, interrupts the communication to the terminal equipment.

Moreover, since a DES cipher is used for the approval operation, the result of approval operation features a high credibility. This will be understood from the fact that when the sumcheck is employed as the approval operation, it is not possible to detect the forgery that is so made that the plus and minus are finally in agreement. Further, the approval operation parameter message 16 and the approval operation result message 17 need be very short, and the circuit overhead can be neglected.

The central file 3B in the central processing unit 2 stores a copy of the program held by the terminal file 3A in the terminal equipment 1 (step 401).

The approval operation parameter generator 4 in the central processing unit 2 generates parameters (an initial cipher value 20 and an encipher key 21) (step 402).

The parameters are set to the terminal equipment 1 (step 403).

The approval operation unit 5B in the central processing unit 2 segments the program data read from the central file 3B and enciphers it with the parameters (step 404) to perform the first approval calculation (step 405).

The program read from the terminal file 3A in the terminal equipment 1 is segmented into a plurality of data values (the logic blocks $30_1$ to $30_n$) (step 406).

The approval operation unit 5A in the terminal equipment 1 performs second approval calculation using the segmented data values and the parameters to form the final cipher value 22 (compressed data) (step 407).

The final cipher value 22 is sent to the central processing unit 2 (step 408).

The approval unit 6 in the central processing unit 2 compares the final cipher value with the result of the first approval calculation (step 409).

The approval unit 6 inhibits communication depending when the comparison indicates the values are different.

According to the present invention as described above, forgery of program in the terminal equipment and operation by the forged program can be easily detected by the central processing unit and the communication to the terminal equipment is interrupted. Namely, there is realized a data processing system which features high security performance.

As for the range of approval operation in the terminal equipment and in the central processing unit, the approval operation needs not be effected for all of the terminal program but may be effected for the important portions only.

Moreover, the approval operation may be performed in connection with the data instead of the program, or may be performed in connection with both the program and the data.

What is claimed is:

1. A data processing system having improved security in system communication comprising terminal equipment having means for storing program data comprising a set of instructions that will be executed therein, and a central processing unit which makes communication relative to said terminal equipment, wherein:

said central processing unit comprises:
   means for storing a copy of the program data held by said program data storing means in the terminal equipment;
   first means for segmenting the copy of the program data into a first plurality of segmented data blocks by dividing the set of instructions into predetermined byte lengths;
   parameter generating means for generating parameters;
   means for sending the parameters to said terminal equipment;
   means for performing first approval calculation comprising means for enciphering the first plurality of segmented data blocks with the parameters for generating a processing unit final cipher value comprising a processing unit compressed cipher of the program data; and, said terminal equipment comprises:
   second means for segmenting the program data into a second plurality of segmented data blocks by dividing the set of instructions into predetermined byte lengths;
   means for performing a second approval calculation comprising means for enciphering the second plurality of segmented data blocks with the parameters for generating a terminal equipment final cipher value comprising a terminal equipment compressed cipher of the program data; and
   means for sending the terminal equipment final cipher value to said central processing unit wherein the program data cannot be forged by an identification of the final cipher value; and said central processing unit further comprises means for comparing said terminal equipment final cipher value with the processing unit final cipher value and means for inhibiting communication with said terminal equipment when the final cipher values are different.

2. A data processing system according to claim 1, wherein the parameter generated by said parameter generated means is a randomly generated number.

3. A data processing system according to claim 1, wherein said means for performing the second approval calculation forms DES ciphers.

4. A data processing system according to claim 1, wherein said first approval calculation is equivalent to said second approval calculation for continued terminal to processing unit communication.

5. A data processing system having improved security in system communication comprising:
   a central processing means;
   a plurality of remote terminals; and, a means for communication between the central processing means and the remote terminals;

each one of the plurality of remote terminals comprising:

a means for storing program data;

a means for segmenting the program data into a plurality of first data values;

a means for receiving a second data value from the central processing means; and, a means for calculating a terminal identifying value using the second data value and the first segmented data values;

the central processing means further comprising:

a means for randonly generating the second data value;

a means for transmitting the second data value to the each one of the plurality of remote terminals;

a means for storing a copy of the program data in each one of the plurality of remote terminals;

a means for segmenting the copy of the program data into third data values;

a means for calculating a processing identifying value using the randomly generated second data value and the segmented third data values;

a means for comparing the processing identifying value calculated by the central processing means and the terminal identifying value calculated by the each one of the plurality of remote terminals; and, a means for selectively inhibiting communication between the central processing means and the each one of the plurality of remote terminals when the processing identifying value is not equivalent to the terminal identifying value.

6. The data processing system as defined in claim 5 wherein the means for calculating a terminal identifying value and the means for calculating a processing identifying value comprise means for compressing the first, second, and third data values into a final cipher data value having a data length less than the program data.

7. An improved method for securing a remote terminal and remote terminal program wherein the terminal is in operative communication with a central processor comprising the steps of:

storing program data in the remote terminal and a copy of the program data in the central processor;

segmenting the program data and the copy into a plurality of data values;

separately calculating a terminal identifying value and a processor identifying value from the segmented data values and a randomly generated number wherein the program data cannot be unauthorizedly forged by an identification of the identifying values;

comparing the identifying values; and, inhibiting communication between the processor and terminal when the processor and terminal identifying values are not equivalent.

8. The method of claim 7 wherein the separately calculating step comprises compressing the program data from the program data segments and randomly generated numbers into the identifying values, the identifying values comprising final cipher values having a data length less than the program data.

9. A data processing system for improved securing of a remote system terminal and a remote system terminal program against unwarranted communication and program processing comprising:

a central processor and a remote terminal for normal communication with the processor, the processor including means for randomly generating parameters comprising an initial cipher value and an encipher key;

means for storing program data in the terminal and processor, the processor and terminal each including an encipher unit including means for calculating a cipher value from the randomly generated parameters and a one of a plurality of data values, each one of the plurality of data values comprising a segmented data block of the program data, and means for calculating a final cipher value from the calculated cipher value, another one of the plurality of data values and the randomly generated parameters; and, means for comparing the processor and terminal final cipher values and for inhibiting communication between the terminal and processor when the processor and terminal final cipher values are not equivalent.

10. The data processing system as defined in claim 9 wherein the means for calculating comprises means for compressing the program data into a final cipher value having a data length less than a program data length.

11. An improved method for securing communications affecting a program in a system including a central processing and a remote terminal wherein the processor and terminal are in operative communication, comprising the steps of:

storing the program in the remote terminal and a copy of the program in the central processor;

segmenting the program and the copy of the program into a plurality of data values;

generating a random parameter in the processor and sending the parameter to the remote terminal;

calculating a terminal final cipher value and a processor final cipher value using the random parameter and the plurality of data values wherein the final cipher values comprise a reduction in size from the program data to preclude forgery of the program upon unauthorized identification of the final cipher values;

comparing the terminal and processor final cipher values; and, approving the communication between the processor and the terminal when the final cipher values are in agreement whereby improved security in system communication and terminal verification is provided by using final cipher values that cannot be used to forge the program data.

12. The method as claimed in claim 11 wherein the data values comprise logic blocks of the program.

13. The method as described in claim 12 wherein the calculating comprises encrypting the logic blocks and the random parameter to compile a DES cipher of the program.

14. The method as claimed in claim 11 wherein the data values comprise logic blocks of program data of the program.

15. The method as claimed in claim 14 wherein the data values comprise a combination of the program and the program data.

* * * * *

UNITED STATES PATENT AND TRADEMARK OFFICE
CERTIFICATE OF CORRECTION

PATENT NO.   :   5,101,373
DATED        :   March 31, 1992
INVENTOR(S)  :   Katsuaki Tanioka, et al.

It is certified that error appears in the above-identified patent and that said Letters Patent is hereby corrected as shown below:

Claim 2, column 6, line 57, delete the first occurrence of "generated" and insert therefor --generating--.

Claim 11, column 8, line 30, delete "processing" and insert therefor --processor--.

Signed and Sealed this

Fifth Day of October, 1993

Attest:

BRUCE LEHMAN

Attesting Officer   Commissioner of Patents and Trademarks